(12) United States Patent
Natanzon

(10) Patent No.: US 10,346,610 B1
(45) Date of Patent: Jul. 9, 2019

(54) DATA PROTECTION OBJECT STORE

(71) Applicant: EMC IP HOLDING COMPANY LLC, Hopkinton, MA (US)

(72) Inventor: Assaf Natanzon, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 188 days.

(21) Appl. No.: 15/420,207

(22) Filed: Jan. 31, 2017

(51) Int. Cl.
- *G06F 21/00* (2013.01)
- *G06F 21/55* (2013.01)
- *G06F 3/06* (2006.01)

(52) U.S. Cl.
CPC ............ *G06F 21/554* (2013.01); *G06F 3/065* (2013.01); *G06F 3/0619* (2013.01); *G06F 3/0623* (2013.01); *G06F 3/0683* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 8,713,684 | B2* | 4/2014 | Bettini | G06F 21/57 726/25 |
| 10,102,374 | B1* | 10/2018 | Cohen | G06F 21/568 |
| 2012/0233694 | A1* | 9/2012 | Baliga | G06F 21/568 726/23 |
| 2014/0380474 | A1* | 12/2014 | Paithane | H04L 63/145 726/23 |
| 2015/0220735 | A1* | 8/2015 | Paithane | G06F 21/566 726/23 |
| 2015/0264077 | A1* | 9/2015 | Berger | G06F 21/554 726/23 |
| 2015/0269383 | A1* | 9/2015 | Lang | G06F 21/57 726/1 |
| 2016/0112443 | A1* | 4/2016 | Grossman | H04L 63/1416 726/23 |
| 2016/0117497 | A1* | 4/2016 | Saxena | G06F 21/566 726/23 |
| 2017/0353477 | A1* | 12/2017 | Faigon | H04L 63/1416 |

OTHER PUBLICATIONS

Zhang, Youhui et al. Virtual-Machine-based Intrusion Detection on File-aware Block Level Storage. 2006 18th International Symposium on Computer Architecture and High Performance Computing (SBAC-PAD'06). https://ieeexplore.ieee.org/stamp/stamp.jsp?tp=&arnumber=4032431 (Year: 2006).*

(Continued)

*Primary Examiner* — Jeremiah L Avery

(74) *Attorney, Agent, or Firm* — Krishnendu Gupta; Peter Jovanovic

(57) ABSTRACT

A computer implemented method, system, and computer program product comprising scanning, using a set of virtual machines, at least one object in an object store to determine if unwanted behavior has occurred on a production site; wherein the object store has a set of objects corresponding to a copy of a storage device at one or more points in time (PITs) on a production site; wherein the objects store include data objects and metadata objects for each of the one or more PITs.

17 Claims, 23 Drawing Sheets

(56) References Cited

OTHER PUBLICATIONS

More, Asit; Tapaswi, Shashikala. Dynamic malware detection and recording using virtual machine introspection. DSCI—Best Practices Meet 2013. https://ieeexplore.ieee.org/stamp/stamp.jsp?tp=&arnunnber=6615011 (Year: 2013).*

Schwarzkopf, Roland et al. Multi-Layered Virtual Machines for Security Updates in Grid Environments. 2009 35th Euromicro Conference on Software Engineering and Advanced Applications. https://ieeexplore.ieee.org/stamp/stamp.jsp?tp=&arnumber=5350011 (Year: 2009).*

\* cited by examiner

DATA PROTECTION OBJECT STORE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by generating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

A computer implemented method, system, and computer program product comprising scanning, using a set of virtual machines, at least one object in an object store to determine if unwanted behavior has occurred on a production site; wherein the object store has a set of objects corresponding to a copy of a storage device at one or more points in time (PITs) on a production site; wherein the objects store include data objects and metadata objects for each of the one or more PITs.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
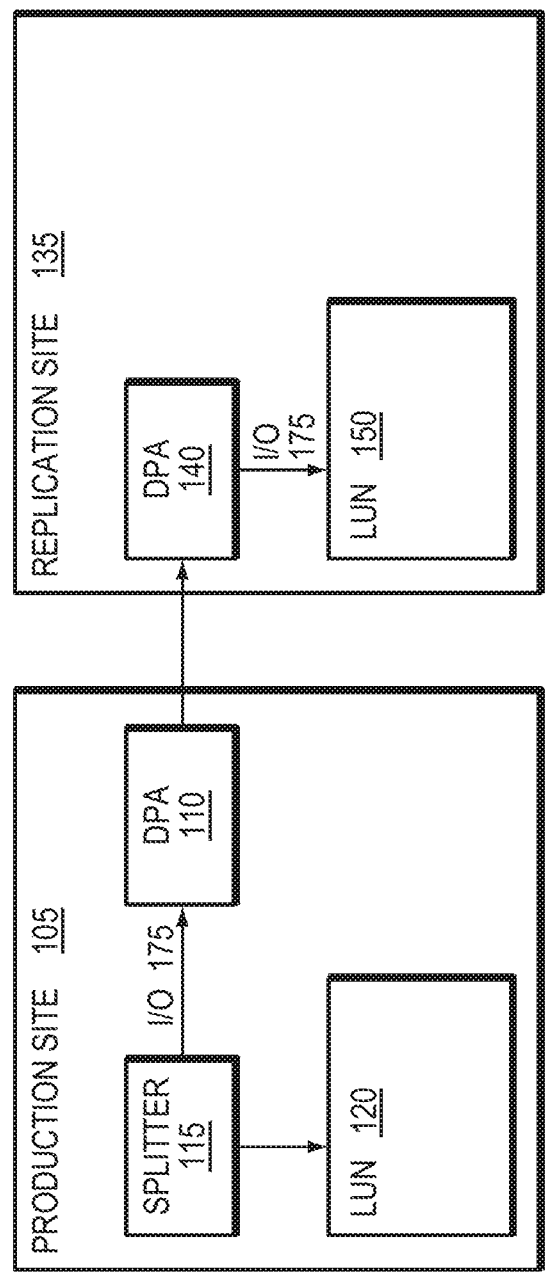
FIG. 1 is a simplified illustration of a data protection system, in accordance with an embodiment of the present disclosure.

In most embodiments, a copy of a LUN or LU may be made. In some embodiments, a copy of a LUN or LU may include a set of objects, which may represent data on the LUN. In most embodiments, a copy of a LUN may include one or more metadata objects, which may describe how a set of objects representing data of the LUN correspond to or may be used to create the LUN. In most embodiments, a copy of a LUN or LU as a set of metadata objects and a set of objects may be sent to a cloud. In certain embodiments, a copy of a LUN or LU as a set of metadata objects and a set of objects may be sent to an object store.

In certain embodiments the current disclosure may enable replication to a cloud. In many embodiments, the current disclosure may enable to replication to an object store. In some embodiments, the current disclosure may enable replication to a cloud with an object store. In most embodiments, replication to an object store may include sending objects representing changes to one or more LUNS on a production site to an object store. In certain embodiments, an object may represent a logical construct containing data. In many embodiments, an object may be overwritten. In most embodiments, it may be possible to append to an object. In certain embodiments, it may not be possible to modify an object. In other embodiments, it may not be possible to modify an object other than rewriting the object or appending to the object.

In some embodiments, IO sent to a LUN or LU on a production site may be intercepted by a splitter. In many embodiments, a splitter may send a copy of IO sent to a LUN or LU to a data protection appliance or data protection application (DPA). In most embodiments, a data protection appliance may accumulate IO and package it into an object. In certain embodiments, as used herein a change object may refer to an object with accumulated IO. In many embodiments, a DPA may accumulate IO until a certain size, such as one megabyte, is reached. In most embodiments, a DPA may send a data object representing IO to a cloud. In many embodiments, a cloud may be an object store. In certain embodiments, a DPA may track metadata about changes corresponding to IO in an object. In some embodiments herein, an object containing metadata may be referred to as a metadata object. In many embodiments, a DPA may send a metadata object to a cloud or an object store when the metadata object reaches a certain size, such as one megabyte. In other embodiments, a DPA may accumulate IO and metadata and package the IO and metadata into an object when a certain threshold or size is reached. In many embodiments herein, a LU or LUN may be used interchangeable for each other.

In many embodiments, an object store may have a copy of a LUN as a set of objects and a set of metadata objects. In these embodiments, as IO occurs to the LUN, the object store may receive a set of change objects corresponding to the changes written to the LUN. In these embodiments, the object store may receive a set of metadata objects describing the changes to the LUN in the objects. In most of these embodiments, the set of change objects and the set metadata objects may be used as a journal. In most of these embodiments, using the set metadata objects, one or more portions of the or more of the change objects may be applied to the create new objects to replace the set of objects and set of metadata objects corresponding to the copy of the LUN. In most of these embodiments, by replacing objects and metadata objects corresponding to the LUN may move the copy of the LUN to a future point in time. In some of these embodiments, by keeping the original set of metadata objects and objects, it may be possible to access the original LUN as well as any point in time. In most of these embodiments, by reading the metadata objects describing the set of change objects, multiple points of time may be created on the cloud site. In further embodiments, metadata objects may be created that correspond to information about how to move a new point in time back to a previous point in time.

In many embodiments, a set of virtual machines may be used in the cloud or in the object store. In certain embodiments, a set of virtual machines in a cloud may process a of metadata objects describing the set of change objects to create a new point in time for a LUN. In many of these certain embodiments, the set of virtual machines may read a set of metadata objects corresponding to the set of change objects to create new objects to replace a set of original objects corresponding to a LUN. In many of these certain objects, the set of virtual machines may create new metadata objects to describe the LUN at a future point in time, where the new metadata objects may reference some of the original objects corresponding to the LUN and the new objects that replace one or more of the original objects corresponding to the LUN.

In further embodiments, a set of virtual machines may run periodically to create new points in time for an object store or cloud containing changes to a copy of a LUN. In many embodiments, objects and metadata objects that correspond to a point in time outside of a protection window may be deleted. In most embodiments, a protection window may correspond to a time period where changes to a LUN may be tracked. In other embodiments, objects and metadata objects that may be deleted if it is desired to reduce the amount of data stored for a given protection window. In many embodiments, a set of virtual machines may process a set of change objects and a set of metadata objects to create a journal to enable a point in time to be rolled forward and backward in time. In certain embodiments, the journal may be represented by a set of objects. In other embodiments, the journal may be represented by a different data structure.

In some embodiments, there may be a set of change objects, which contain metadata and change data, and a set of metadata objects describing the change data. In certain embodiments, if a failure occurs on the production site, data described by the metadata object on the production site, not yet sent to the replication site, may result in data loss corresponding to change objects. In other embodiments, if a change object contains metadata describing change data, metadata object may be recreated using the embedded metadata.

Typically, ransomware and other malware may be problematic to an organization. Conventionally, it may not have been possible to determine that ransomware or malware has been installed. Generally, scanning for and detecting ransomware and malware may have been a process intensive endeavor and may have interfered with other activities on a host or production site.

Similarly, detection of corruption or other problems with host data using standard techniques may have also been problematic. Usually, detecting problems with data on a host site may have been processor intensive and may have subtracted from other activities at the host or production site.

In certain embodiments, the current techniques may enable verification of data on a host by examining replicated data. In many embodiments, detection of malware may be enabled without impacting processing power of a host or production site or otherwise impacting host or production activities. In certain embodiments, detection of data corruption may be enabled without impacting activities or using processing power on a host or production site. In many embodiments, replicated data may be scanned to determine problems with data.

In most embodiments, both read and write IOs may be captured on a product site. In some embodiments, both read and write IO metadata may be captured by on a production site. In certain embodiments, the write and read data may be captured by a splitter. In certain embodiments, the write and read metadata may be captured by a splitter. In most embodiments, read metadata and write metadata may be captured and stored. In most embodiments, the read metadata and write metadata and the read and write IOs may be sent to a cloud. In many embodiments, read and write metadata may be captured in objects and sent to a replication site. In certain embodiments read and write data may be captured in objects and sent to a replication site. In certain embodiments read and write metadata may be captured in objects and sent to a replication site. In many embodiments, a replication site may be in or part of a cloud.

In many embodiments, by capturing read and write IOs and the associated metadata of virtual machines running in a hypervisor it may be possible to reconstruct all the activities of one or more virtual machines. In most embodiments, the ability to reconstruct activity of a virtual machine may enable determination of whether the virtual machine has been infected with malware or otherwise compromised. In some embodiments, by scanning the activities performed by a virtual machine on files it may be able to determine if unwanted activity occurred.

In certain embodiments, a replication site on a cloud may periodically spin up a number of virtual machines may examine read and write data and metadata to look for unwanted activity. In most embodiments, by using virtual machines in a cloud to look for unwanted activity based on replicated data, there may be little or no impact on a product site. In many embodiments, a replication site can examine replicated data for activity known to suspicious or unwanted. In most embodiments, using a replication site to determine unwanted or suspicious activity may be transparent to a production site. In many embodiments, a replication site can detect suspicious or unwanted activity determine which virtual machine is causing the activity. In most embodiments, many activities may be performed in parallel in a cloud. In further embodiments, activities may be performed in a cloud that may not be possible on a production site.

In most embodiments, a replication site may be able to determine when the virtual machine became infected or compromised. In many embodiments, a replication site may enable a virtual machine or portions of the virtual machine to be rolled back to before the virtual machine was infected or compromised. In some embodiments, when a replication site rolls back a virtual machine data not impacted by the infection may be maintained. In certain embodiments, when a replication site rolls back a virtual machine, only portions of the virtual machine impacted by or causing the suspicious or unwanted behavior may be rolled back.

In certain embodiments, a replication site may determine that a file's data no longer corresponds to the file type for the file. In a particular embodiment, an MP3 file may indicate suspicious or unwanted activity if it no longer contains data of a type associated with an MP3. In other embodiments, if a particular file experiences a number of sequential reads and writes, this may indicate unwanted or suspicious activity. In further embodiments, if a file and its associated data becomes encrypted, this may indicate suspicious or unwanted activity such as a malware attack encrypting user data.

In still further embodiments, read and write access patterns may be compared with known unwanted access patterns to determine unwanted or suspicious behaviors. In other embodiments, algorithms such as neural networks or machine learning may examine read and write patterns to determine if unwanted or suspicious activities have occurred. In further embodiments, read and write metadata may be monitored for known suspicious or unwanted activity by one or more virtual machines in a cloud. In further embodiments, time of infection of a production site may be shared across replication sites to proactively capture infection that occurs at similar times. In some embodiments, multiple production sites, for example of different customers, may be infected at similar times due to release of new virus, ransomware, or malware.

In certain embodiments, a comparison may be made between two different points in time for replicated a replicated virtual disk for a virtual machine. In some embodiments, virtual machines in a cloud may be created and create two different points in time for a virtual machine on a production site being replicated to the cloud. In many embodiments, virtual machines in a cloud may compare images corresponding to a replicated virtual machine disks at a production site at two different points in time to examine differences between file data of the images at the two different points in time. In most embodiments, virtual machines in a cloud may be able to determine using write and read data and write and read metadata if files on the image later in time have been accessed or changed in a suspicious or unwanted matter.

In many embodiments, a cloud may be able to rapidly scale the amount of virtual machines running and looking at the replicated data for problems enabling problems to be found in quick and efficient manner. Generally, storage and processing power on a production site may be limited. In other embodiments, once suspected or unwanted activity is suspected, further resources in a cloud or replication site may be allocated to detecting the activity.

In certain embodiments, a replication site may be able to determine suspicious or unwanted activity by examining read and write metadata objects on the replication site. In other embodiments, a replication site may be able to determine suspicious or unwanted activity be comparing two points in time for a replicated virtual machine disk image. In further embodiments, a replication site may be able to determine suspicious activity be examining both read and write metadata and replicated images for a virtual machine. In some embodiments, a replication site or cloud may been to create replicated images using the techniques described herein.

In a particular embodiment, comparing two images may indicate that files are being encrypted by finding a pattern of sequential reads and writes to a series of files. In another embodiment, comparing two images may determine that files no longer have data associated with the file type of those files. In further embodiments, once suspicious or unwanted activity is detected, it may be determined what change occurred to the replicated virtual machine when the suspicious or unwanted activity started. In many embodiments, a replicated virtual machine may be examined for malware, ransomware, or viruses. In most embodiments, once a virtual machine has found to be infected by malware, ransomware, or viruses, all or part of the virtual machine may be rolled back or reinstalled to remove the infection. In further embodiments, changes between files at different points in time may indicate unwanted or suspicious activity. In still further embodiments, analysis of a particular virtual machine's metadata or of a particular client's metadata may be shared across virtual machines or other clients to determine patterns of unwanted or suspicious behavior. In certain embodiments, file entropy may be used to determine unwanted or suspicious behavior.

In most embodiments, read and write metadata may be extracted from objects on the replication site. In many embodiments, data for images at different points in time may be extracted from objects on the replication site.

In certain embodiments, when replicated object data may be examined in a highly parallel manner. In many embodiments, a parallel or scalable way of examining data may be to create virtual machines and assign portion of the data or files corresponding to the data to different virtual machines. In further embodiments, multiple virtual machines may enable checking of multiple versions of a file in multiple points in time improving scanning and detection speed.

The following may be helpful in understanding the specification and claims:

BACKUP SITE—In certain embodiments, a back-up site may be a facility where replicated production site data is stored; the backup site may be located in a remote site or at the same location as the production site; a backup site may be a virtual or physical site. In certain embodiments, a back-up site may be an object store.

CLONE—In some embodiments, a clone may be a copy or clone of the image or images, drive or drives of a first location at a second location; In some embodiments, a clone may be made up of a set of objects.

DELTA MARKING STREAM—In some embodiments, a delta marking stream may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—In some embodiments, a DPA may be Data Protection Appliance a computer or a cluster of computers, or a set of processes that serve as a data protection appliance, responsible for data protection services including inter alia data replication of a storage system, and journaling of I/O requests issued by a host computer to the storage system. In certain embodiments, a DPA may be a physical device, a virtual device running, or may be a combination of a virtual and physical device.

RPA—In certain embodiments, a RPA may be replication protection appliance, is another name for DPA. An RPA may be a virtual DPA or a physical DPA.

HOST—In certain embodiments, a host may be at least one computer or networks of computers that runs at least one data processing application that issues I/O requests to one or more storage systems; a host is an initiator with a SAN; a host may be a virtual machine.

HOST DEVICE—In certain embodiments, a host device may be an internal interface in a host, to a logical storage unit;

IMAGE—In certain embodiments, an image may be a copy of a logical storage unit at a specific point in time;

INITIATOR—In certain embodiments, an initiator may be a node in a SAN that issues I/O requests;

JOURNAL—In certain embodiments, a journal may be a record of write transactions issued to a storage system; used to maintain a duplicate storage system, and to rollback the duplicate storage system to a previous point in time;

LOGICAL UNIT—In certain embodiments, a Logical unit may be a logical entity provided by a storage system for accessing data from the storage system;

LUN—In certain embodiments, a LUN may be a logical unit number for identifying a logical unit; may also refer to one or more virtual disks or virtual LUNs, which may correspond to one or more Virtual Machines. As used herein, LUN and LU may be used interchangeably to refer to a LU.

In certain embodiments, a Management and deployment tools may provide the means to deploy, control and manage the RP solution through the virtual environment management tools.

In certain embodiments, a PHYSICAL STORAGE UNIT may be a physical entity, such as a disk or an array of disks, for storing data in storage locations that can be accessed by address;

In certain embodiments, a PRODUCTION SITE may be a facility where one or more host computers run data processing applications that write data to a storage system and read data from the storage system; may be a virtual or physical site.

In certain embodiments, a SAN may be a storage area network of nodes that send and receive I/O and other requests, each node in the network being an initiator or a target, or both an initiator and a target;

In certain embodiments, a SOURCE SIDE may be a transmitter of data within a data replication workflow, during normal operation a production site is the source side; and during data recovery a backup site is the source side; may be a virtual or physical site.

SNAPSHOT—In certain embodiments, a Snapshot may refer to differential representations of an image, i.e. the snapshot may have pointers to the original volume, and may point to log volumes for changed locations. In some embodiments, Snapshots may be combined into a snapshot array, which may represent different images over a time period.

In certain embodiments, a STORAGE SYSTEM may be a SAN entity that provides multiple logical units for access by multiple SAN initiators.

In certain embodiments, a TARGET may be a node in a SAN that replies to I/O requests;

In certain embodiments, a TARGET SIDE may be a receiver of data within a data replication workflow; during normal operation a back site is the target side, and during data recovery a production site may be a target side; may be a virtual or physical site; a target site may be referred to herein as a replication site;

In certain embodiments, a WAN may be a wide area network that connects local networks and enables them to communicate with one another, such as the Internet.

In certain embodiments, a SPLITTER/PROTECTION AGENT may be an agent running either on a production host a switch or a storage array which can intercept IO and split them to a DPA and to the storage array, fail IO redirect IO or do any other manipulation to the IO; In some embodiments, a the splitter or protection agent may be used in both physical and virtual systems. In many embodiments, a splitter may be in the IO stack of a system and may be located in the hypervisor for virtual machines.

In certain embodiments, a VIRTUAL VOLUME may be a volume which is exposed to host by a virtualization layer, the virtual volume may be spanned across more than one site and or volumes.

In certain embodiments, a VASA may be a set of vCenter providers that allow an administrator to manage storage.

In certain embodiments, a VMFS may be a virtual machine file system, a file system provided by VMware for storing a virtual machine.

In certain embodiments, a VMDK may be a virtual machine disk file containing a disk data in a VMFS. Analog to a LUN in a block storage array.

In certain embodiments, a Virtual RPA (vRPA)/Virtual DPA (vDPA) may be a DPA running in a VM.

In certain embodiments, a VASA may be vSphere Storage application program interfaces (APIs) for Storage Awareness.

In certain embodiments, a MARKING ON SPLITTER may be a mode in a splitter where intercepted IOs are not split to an appliance and the storage, but changes (meta data) are tracked in a list and/or a bitmap and I/O is immediately sent to down the IO stack.

In certain embodiments, a FAIL ALL MODE may be a mode of a volume in the splitter where write and read IOs intercepted by the splitter are failed to the host, but other SCSI commands like read capacity are served.

In certain embodiments, LOGGED ACCESS may be an access method provided by the appliance and the splitter, in which the appliance rolls the volumes of the consistency group to the point in time the user requested and let the host access the volumes in a copy on first write base.

In certain embodiments, a VIRTUAL ACCESS may be an access method provided by the appliance and the splitter, in which the appliance exposes a virtual volume from a specific point in time to the host, the data for the virtual volume is partially stored on the remote copy and partially stored on the journal.

In certain embodiments, Continuous Data Protection (CDP), may refer to a full replica of a volume or a set of volumes along with a journal which allows any point in time access, the CDP copy is at the same site, and maybe the same storage array of the production site.

In certain embodiments, Continuous Remote Replica (CRR) may refer to a full replica of a volume or a set of volumes along with a journal which allows any point in time access at a site remote to the production volume and on a separate storage array.

In certain embodiments, FAST may be a fully automated storage tiering used to move active data to higher tiers and less active data to lower tiers.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, and METHODS AND APPARATUS FOR OPTIMAL JOURNALING FOR CONTINUOUS DATA REPLICATION and with U.S. Pat. No. 8,332,687, which are hereby incorporated by reference. A description of synchronous and asynchronous replication may be described in the patent titled DYNAMICALLY SWITCHING BETWEEN SYNCHRONOUS AND ASYNCHRONOUS REPLICATION and with U.S. Pat. No. 8,341,115, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Reference is now made FIG. 1, which is a simplified illustration of a data protection system 100, in accordance with an embodiment of the present invention. Shown in FIG. 1 are two sites, production site 105 and replication site 135. Production site has splitter 115, which splits IO sent to LUB 120, such as IO 175, by making a copy of the IO and sending it to DPA 110. DPA 110 sends the IO, such as IO 175, to DPA 140 on replication site 135. DPA 140 on replication site 135 sends IO 175 to LUN 150 on Replication site 135.

Figure 2:
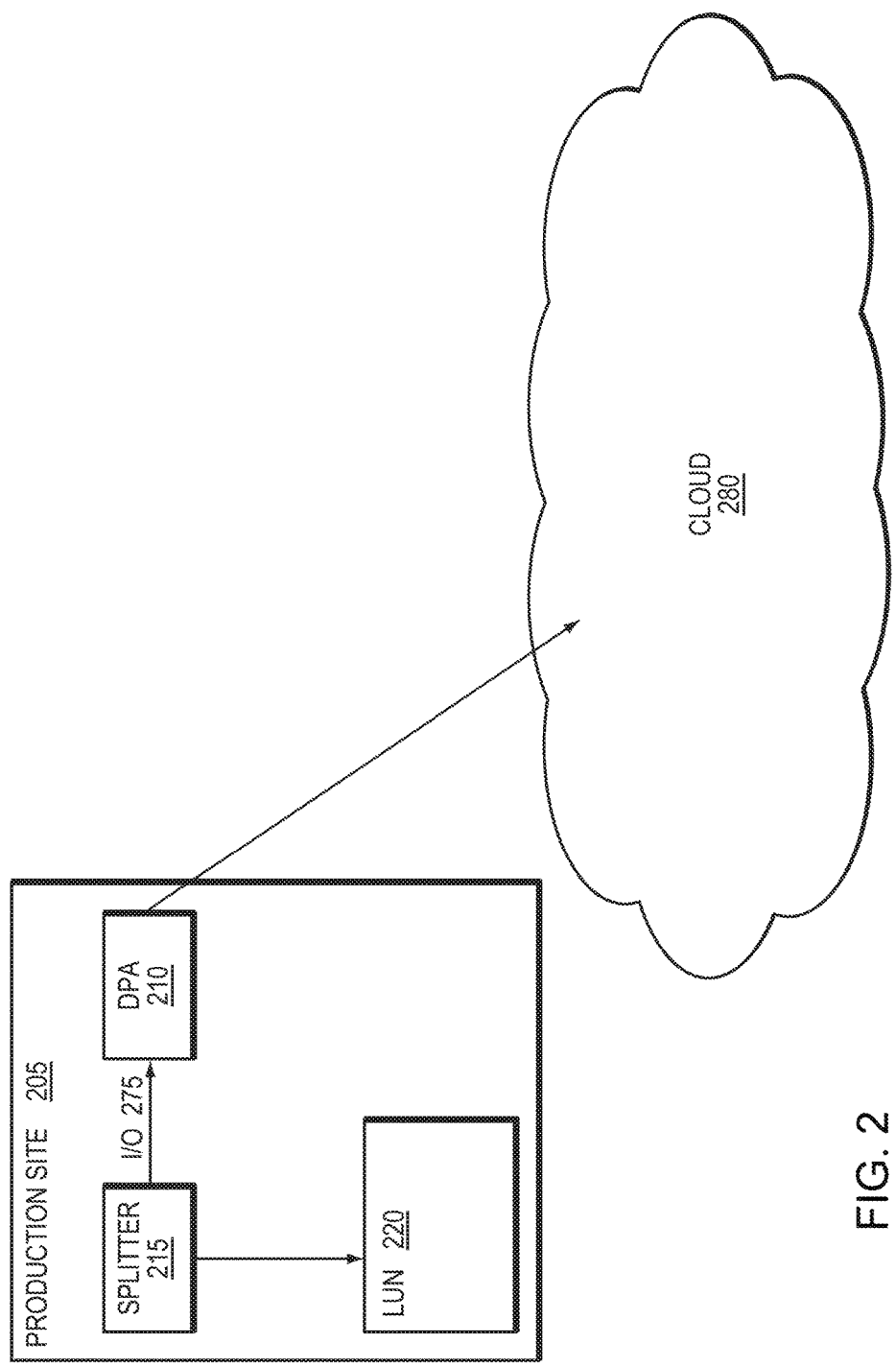
FIG. 2 is an alternative simplified illustration of a data protection system using a cloud, in accordance with an embodiment of the present disclosure.

Refer now to the example embodiment of FIG. 2. In the example embodiment of FIG. 2, there is a production site 205, with DPA 210, splitter 215, and LUN 220. There is also cloud 280, which in this embodiment is has an object store, which functions as a replication site. I/O from production site 205 sent to LN 220 is split and sent to Cloud 280.

Figure 3:
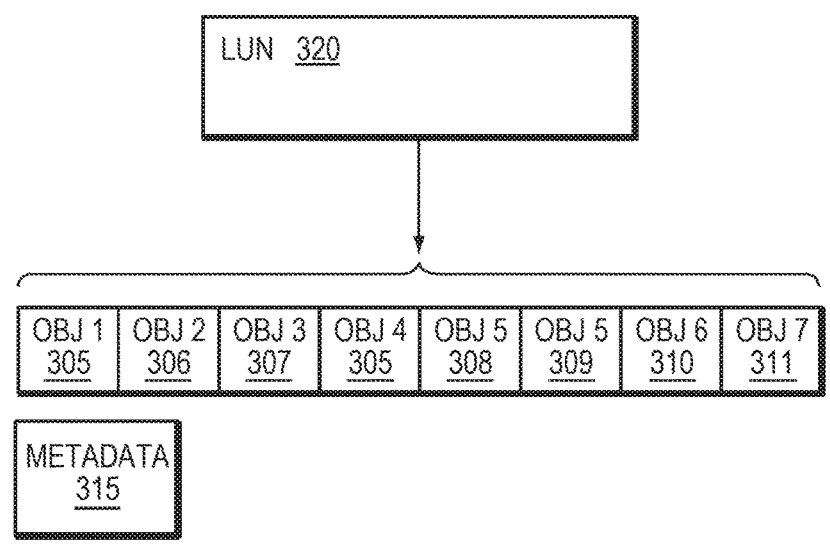
FIG. 3 is a simplified illustration of representing a LUN as a set of objects and a set of metadata objects, according to an embodiment of the disclosure.

Refer now to the example embodiment of FIG. 3. In the example embodiment of FIG. 3, LUN 320 may be represented by a set of objects, Obj 1 305-Obj 7 311, and metadata object 315. In this example embodiment metadata 315 may contain metadata indicating how objects, Obj 1 305-Obj 7 311, represent LUN 320. Refer now as well to the example embodiments of FIGS. 2 and 4. To form the set of objects, Obj 1 305-Obj 7 311, of FIG. 3, LUN 220 is divided into sets of data (step 405). Objects, Obj 1 305-Obj 7 311, are created and populated with data corresponding to the divided sets of data on LUM 220 (step 410). Metadata object 315 is created to describe how the objects, Obj 1 305-Obj 7 311, form the data on LUN 220 (step 415). In other embodiments, metadata object may be a set of metadata objects.

Figure 5:
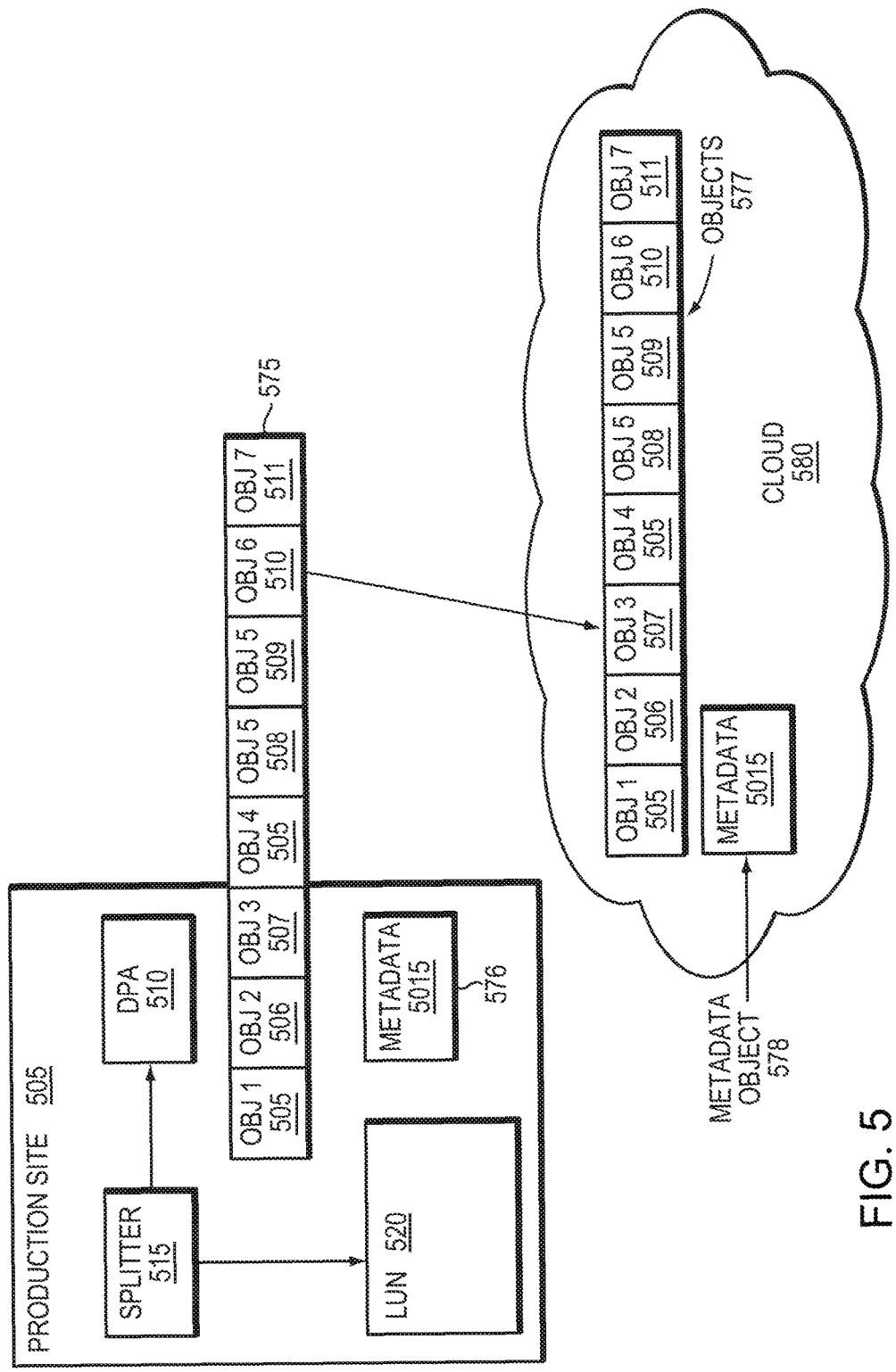
FIG. 5 is a simplified illustration of sending a set of objects representing a LUN to a cloud, according to an embodiment of the disclosure.

Refer now to the example embodiment of FIG. 5. LUN 520 has been partitioned set of data objects 575 and metadata object 576 and DPA 510 has sent the objects to Cloud 580 for storage. In this embodiment, Cloud 580 acts as a replication site storing a copy of LUN 520 as set of data objects 577 and metadata object 578.

Figure 6:
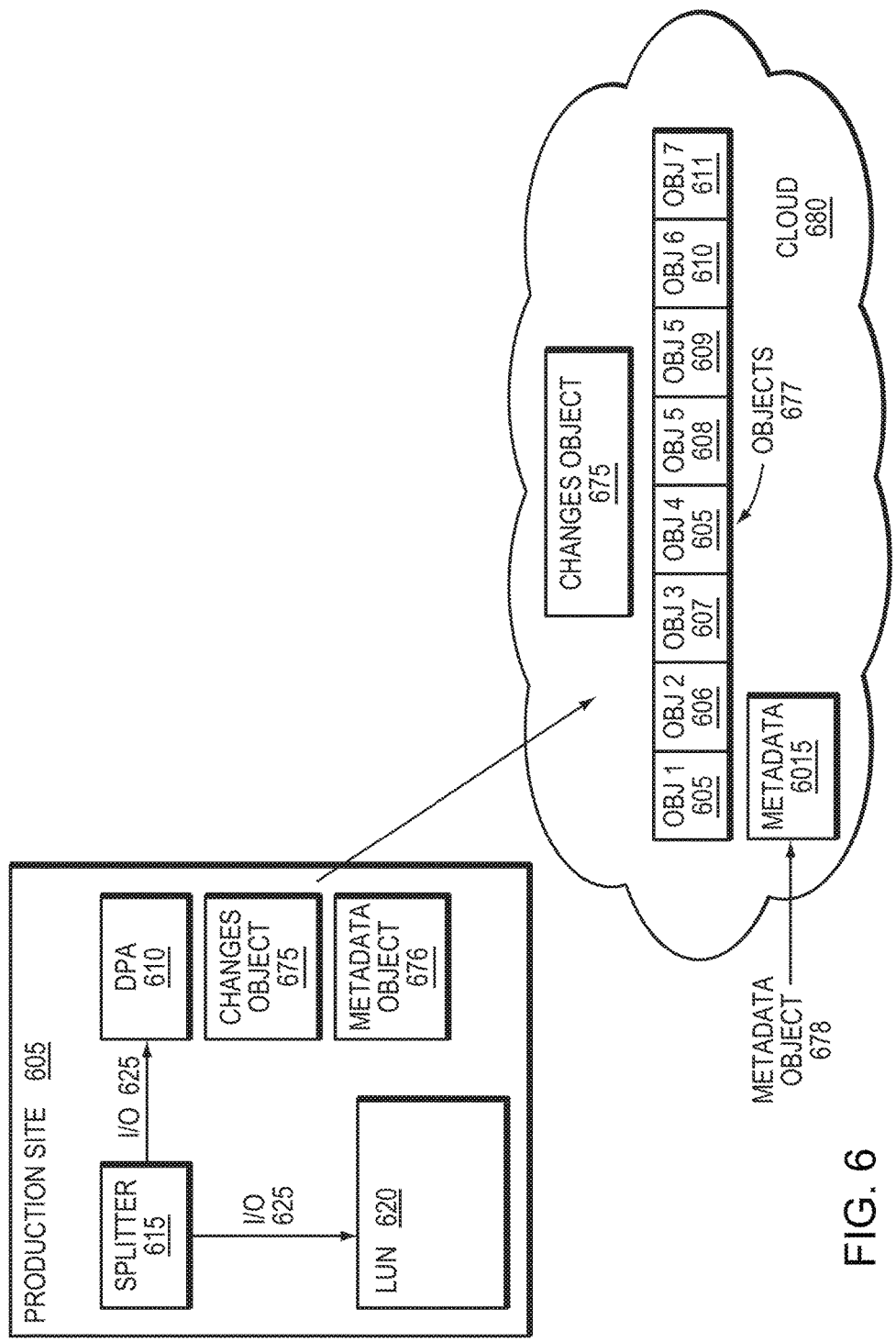
FIG. 6 is a simplified illustration sending a change object from a production site to a cloud replication site, in accordance with an embodiment of the present disclosure.
Figure 7:
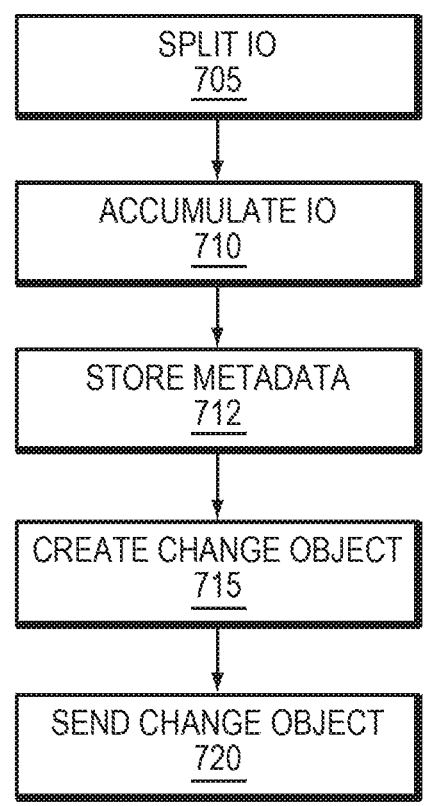
FIG. 7 is a simplified example of a method of replicating changes to a production site as objects to a replication site that includes an object store, in accordance with an embodiment of the present disclosure.

Refer now to the example embodiments of FIGS. 6 and 7. In the example embodiment of FIG. 6, Cloud 680 has a copy of LUN 620 at a point in time stored as objects 677 and metadata object 678. Splitter 615 has intercepted IO 625 written to LUN 620. Splitter 615 has split IO 625 (step 705) by creating a copy of IO 625 and sending a copy to DPA 610. DPA 610 stores IO, such as IO 625, until it has accumulated a given size of IO to create a change object, such as change object 675 (step 710). As well, DPA stores metadata describing the changes of IO to LUN 620 in metadata object 676 (step 712). When DPA 610 has accumulated IO corresponding to a certain size, DPA 610 packages the IO into change object 675 (step 715) and sends the object to Cloud 680 (step 720).

Figure 8:
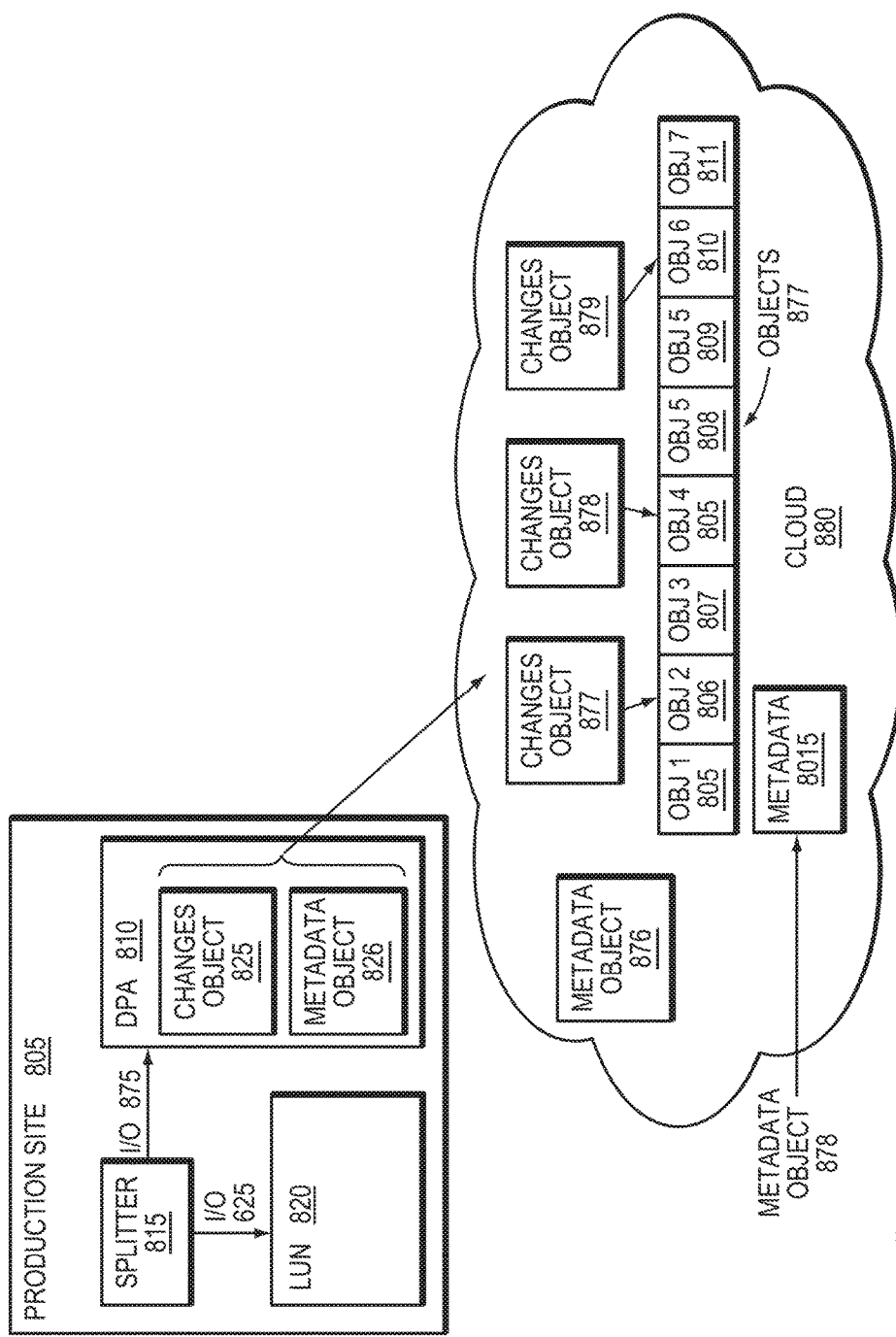
FIG. 8 is a simplified illustration of sending a set of metadata objects describing changes to a LUN to a cloud, according to an embodiment of the disclosure.
Figure 9:
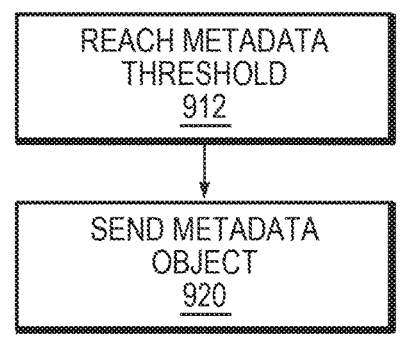
FIG. 9 is a simplified example of a method sending a metadata object to a cloud that has an object store, in accordance with an embodiment of the present disclosure.

Refer now to the example embodiment of FIGS. 8 and 9. In the example embodiment of FIG. 8, Cloud 870 has a copy of LUN 820 at a point in time stored as objects 877, 878, and 879. The set of change objects, objects 877, 878, and 879, are objects corresponding to packaged IO written to IO 820 since the set of objects 677 was created as a copy of LUN 820 at the previous point in time. DPA 810 has reached the threshold for storing metadata in metadata object 825 (step 912). DPA 810 sends metadata object to Cloud 880. Metadata object 876 includes data denoting what data in change objects corresponds to what data changes to objects 877.

Figure 10:
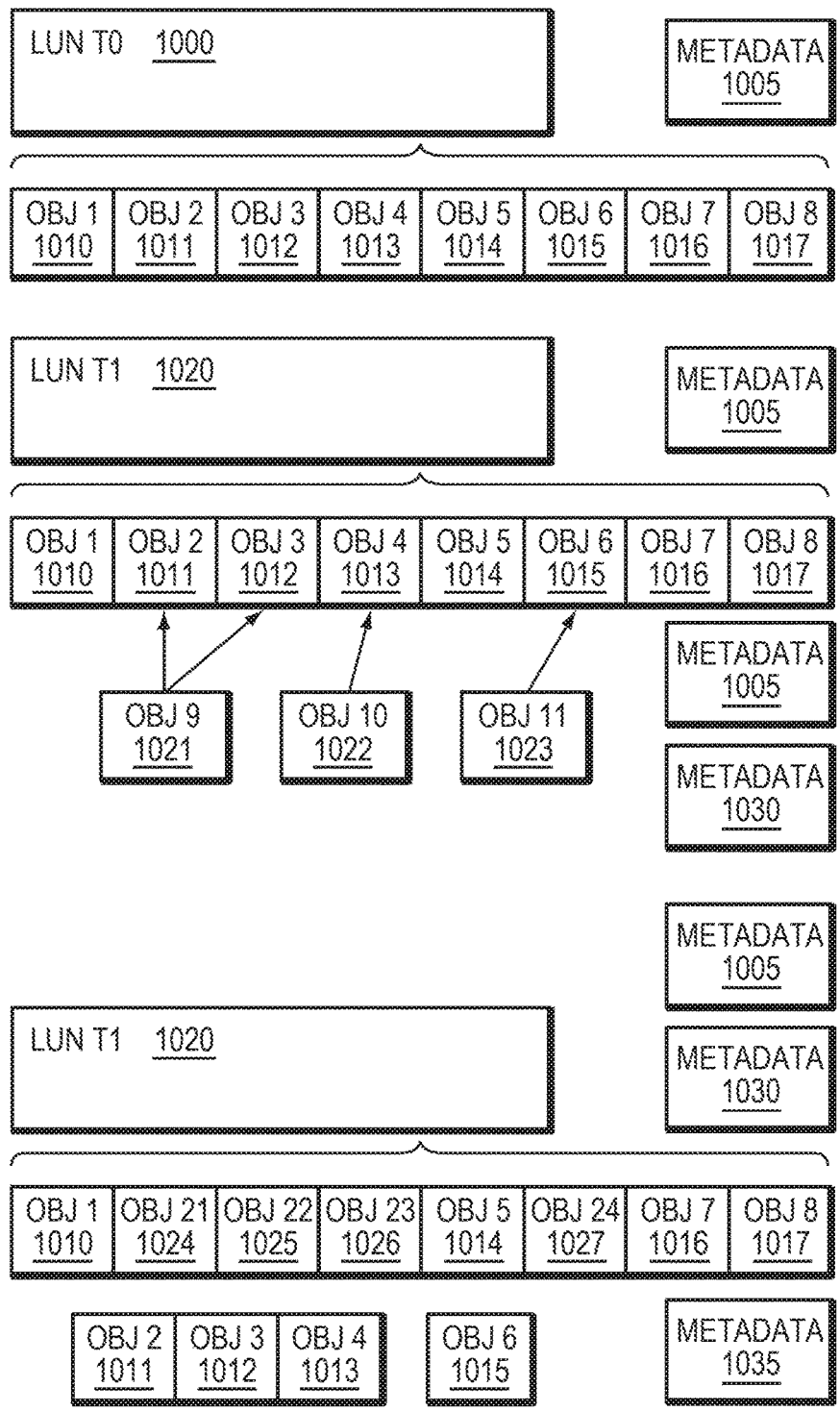
FIG. 10 is a simplified illustration representations of a LUN at different points in time using sets of objects, in accordance with an embodiment of the present disclosure.
Figure 11:
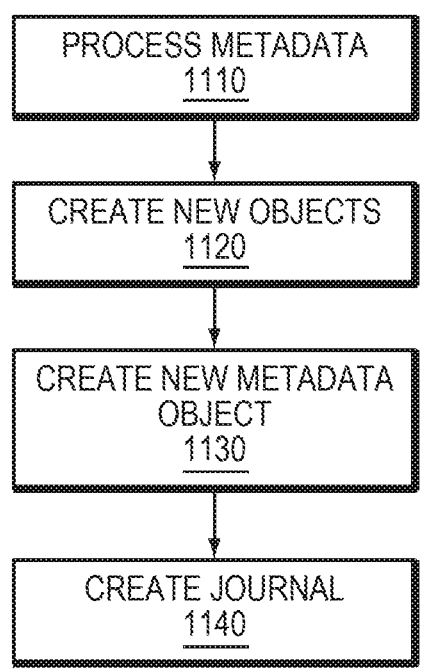
FIG. 11 is a simplified example of a method for creating new points in time for a LUN using a set of objects, in accordance with an embodiment of the present disclosure.

Refer now to the example embodiments of FIGS. 10 and 11, which illustrate processing a set of change objects and a set of metadata objects to create a new point in time. In the example embodiment of FIG. 10, Objects 1 1010-Object 8 1017 and metadata 1005 represent a copy of LUN at time T0 1000. LUN at time T1 1020 is represented by Objects 1 1010-Object 8 1017 and metadata 1005 as well as by object 9 1021, object 10 1022, object 11 1023 and metadata object 1030 which describes which Objects 1 1010-Object 8 1017 need to be changed to move LUN T0 1000 to LUN T1 1020. Metadata in metadata object 1030 is processed (step 1110). New objects object 21 1024, object 22 1025, object 23 1026, and object 24 1027 are created using change objects object 9 1021, object 10 1022, object 11 1023 and the objects they are replacing (object 2 1011, object 3, 1012, object 4 1013, and object 6 1015) (step 1120). New metadata object 1035 is created (step 1030). In many embodiments, a journal may include change objects and metadata.

Figure 12:
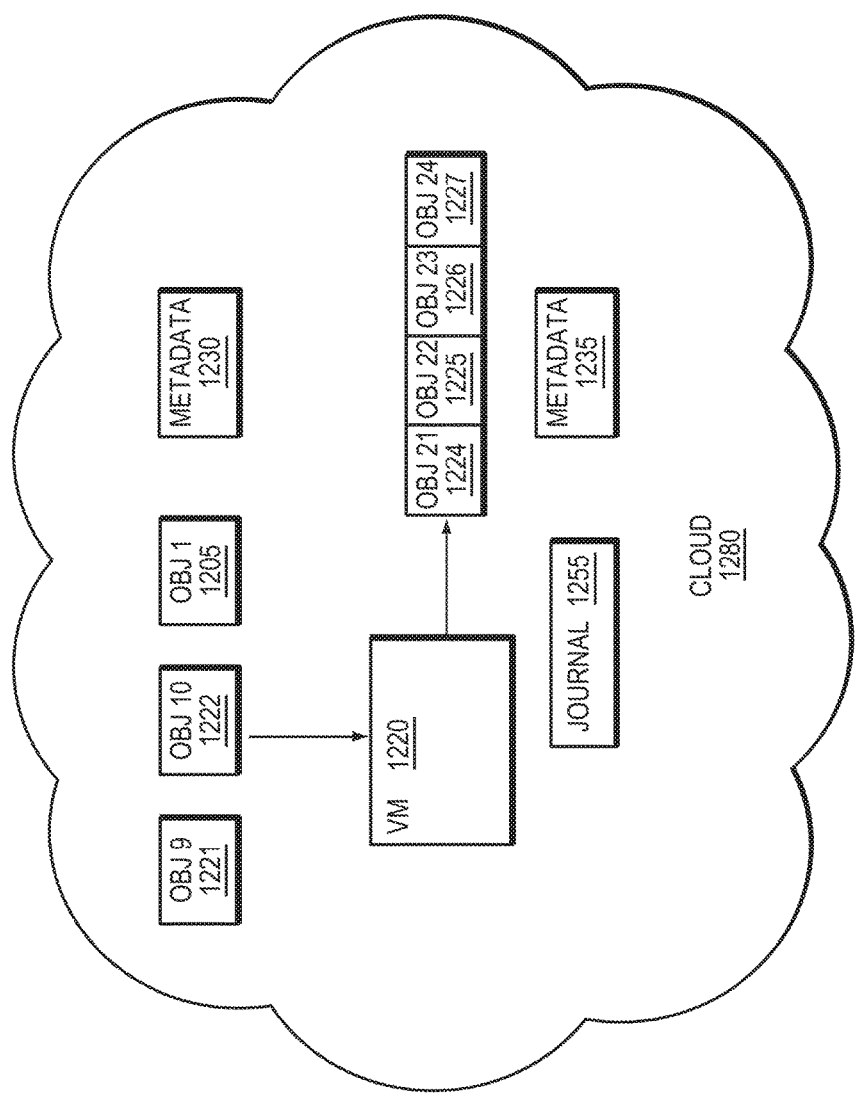
FIG. 12 is a simplified illustration of a virtual machine creating a new point in time using a set of objects, in accordance with an embodiment of the present disclosure.

Refer now to the example embodiments of FIGS. 12 and 11, which illustrate a virtual machine creating new objects and a journal. Virtual Machine 1220 processes metadata object (step 1110) to create new objects (step 1120). Virtual Machine 1220 creates new metadata object (step 1130) to represent the LUN at the new point in time. Using the new metadata object, the new objects, and the objects that were not replaced Virtual Machine 1220 creates the LUN at the new point in time (step 1140). The version of the LUN at the previous point in time, composed of the old objects and metadata objects, is kept for a protection window. The change objects and metadata objects received from the production site are kept as a journal to enable access to other points in time.

Figure 13:
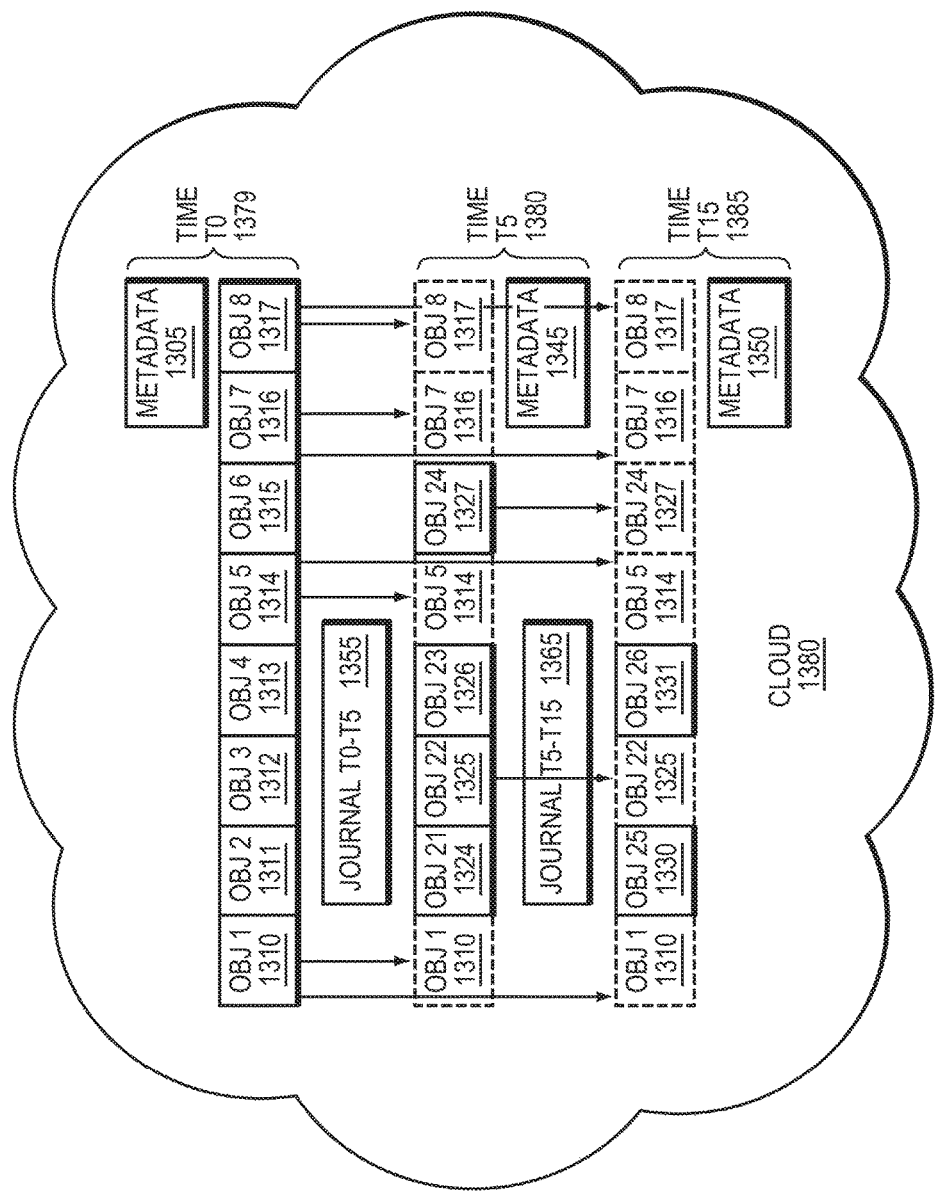
FIG. 13 is a simplified illustration different points in time as represented in an object store in a cloud, in accordance with an embodiment of the present disclosure.

Refer now to the example embodiment of FIG. 13, which illustrates a cloud containing 3 different points of time. In this example embodiment, Time T0 1375 is represented by Object 1 1310-Object 8 1317 and metadata 1305. Time T5 1380 is represented by Object 21 1324, Object 22, 1325, Object 23 1326 and Object 25 1327, metadata 1345, as well as references to Object 1 1310, Object 5 1314 and Object 8 1317, and Object 8 1317. In this example embodiment, time T5 1380 is made up of some new objects and some objects from a previous point in time. Metadata 1345 creates a mapping of which objects are included at Time T5 1380 from a previous point in time. As well, Journal T0-T5 1355 enables Time T5 1380 to be rolled to Time T0 1375. Time T15 1385 is made up of Object 1330, Object 26 1331, Metadata 1350 and references to Object 1 1310, Object 22 1325, Object 5 1314, Object 25 1327, Object 7 1316, and Object 8 1317. Metadata 1350 creates a mapping of which objects are included at Time T15 1385 from a previous point in time. Journal T5-T15 1365 enables Time T15 1380 to be rolled forward to any point in time up to any point in time between Time T1 1380 and Time T5 1385. In other embodiments, if a point in time is beyond a protection window, object corresponding to that point in time may be deleted if they are not referenced in a future point in time that is within the protection window.

In most embodiments, virtual machines may be periodically spun up in a cloud or object store to process change objects and metadata objects. In many embodiments, as virtual machines operate periodically, there may not need to use compute power in the cloud other than when the virtual machines are running.

Figure 14:
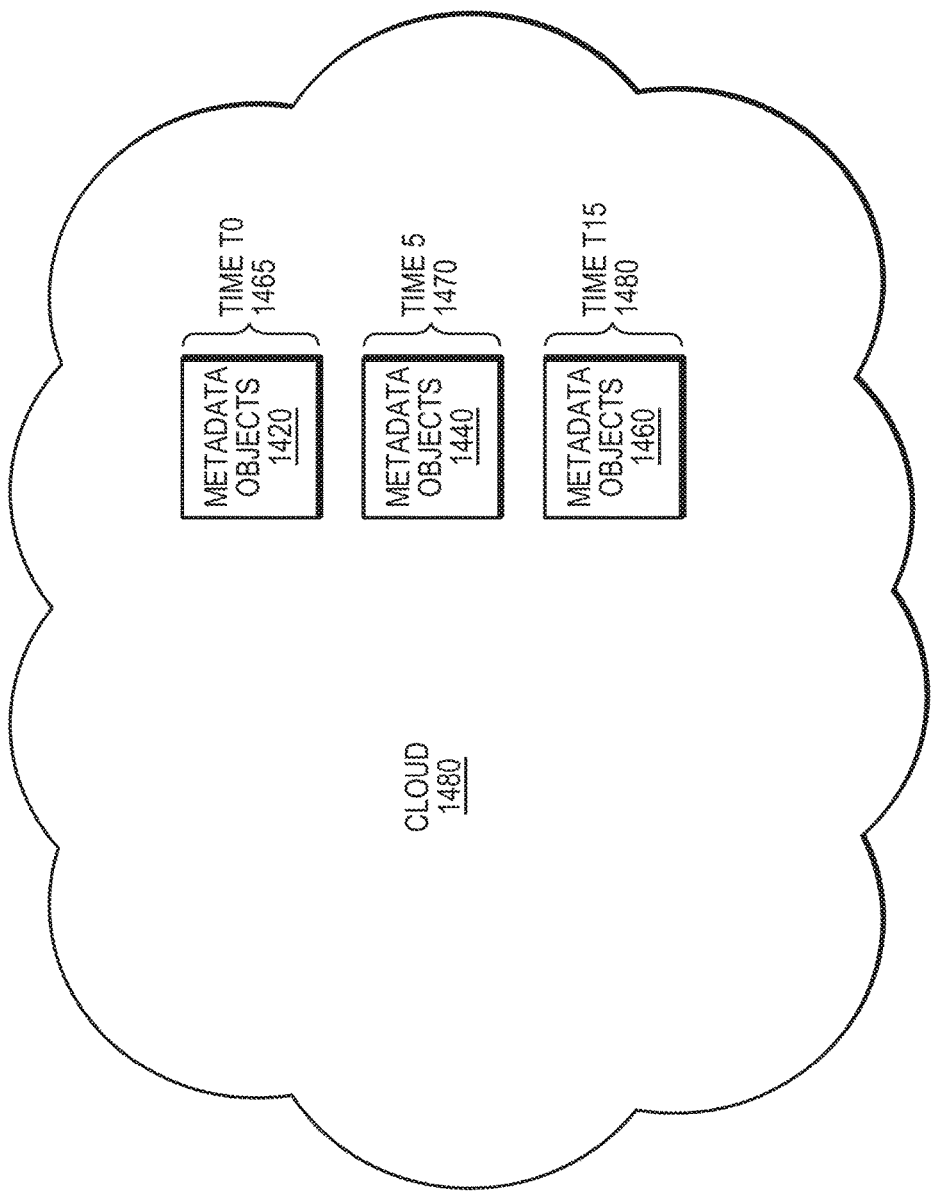
FIG. 14 is a simplified illustration showing metadata objects in a cloud, in accordance with an embodiment of the present disclosure.

Refer now to the example embodiment of FIG. 14. In the example embodiment of FIG. 14, metadata objects 1420 represents time T0 1465. Metadata objects 1440 represents Time T5 1470. Metadata objects 1460 represents Time T15 1480. In the embodiment of FIG. 14, each metadata objects may be made up of a plurality of metadata objects.

Figure 15:
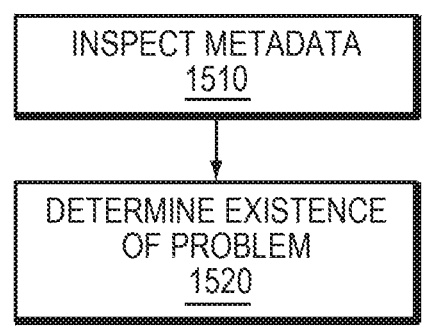
FIG. 15 is a simplified example of a method for scanning metadata objects to determine existence of a problem, in accordance with an embodiment of the present disclosure.
Figure 16:
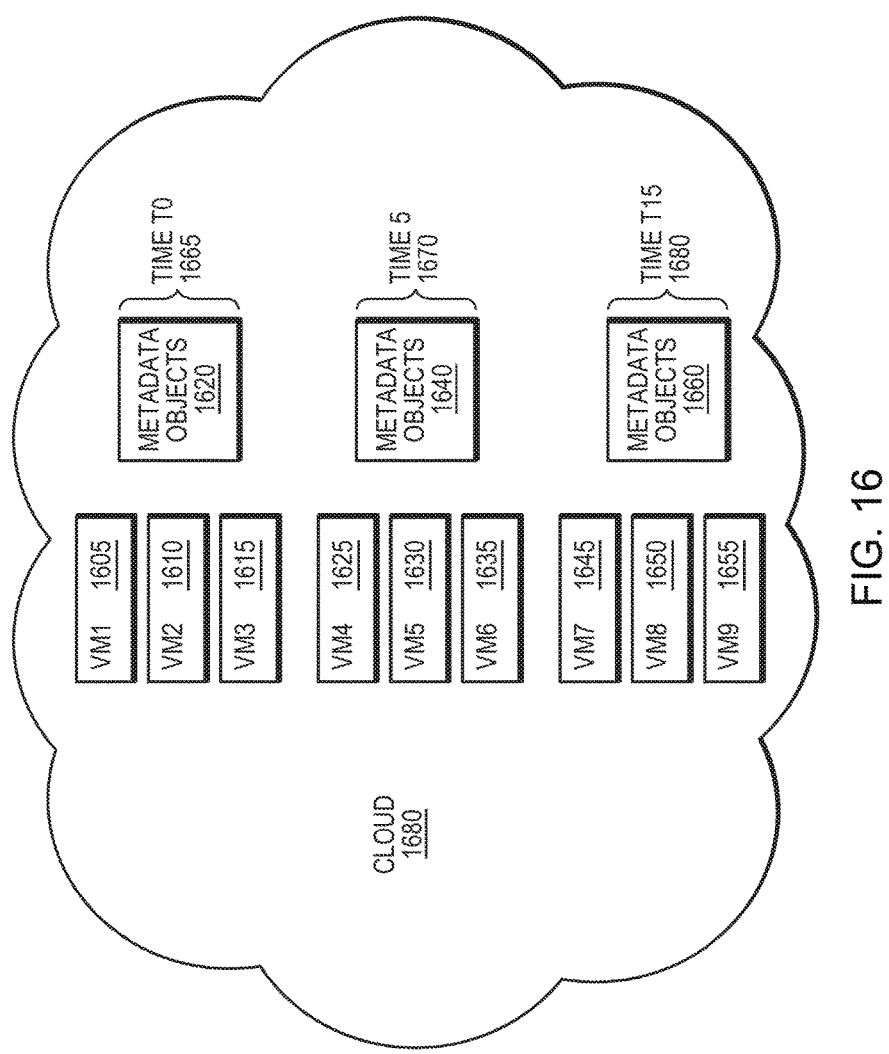
FIG. 16 is a simplified illustration of sets of virtual machines scanning metadata objects to determine a problem, in accordance with an embodiment of the present disclosure.

Refer now to the example embodiment of FIGS. 15 and 16, which illustrate virtual machines inspecting metadata objects. In FIG. 16, there are three sets of Virtual machines composed of virtual machines 1605, 1610, and 1615, 1625, 1630, and 1635, 1645, 1650, and 1644 respectively. There are also three sets of metadata objects, metadata object 1620, metadata object 1640, and metadata object 1660. In other embodiments, there may be any number of virtual machines in each set and any number of sets. In most embodiments, a set of virtual machines may be paired with a set of metadata objects.

Referring back to FIGS. 14 and 15. Virtual machines 1605, 1610, and 1615, 1625, 1630, and 1635, 1645, 1650, and 1644 inspect metadata objects 1620, 1640, and 1660 (step 1510). Based on the inspection, the virtual machines determine whether or not a problem has occurred (step 1520). In these embodiments, when examining the metadata, each time may be used to denote a problem. In these embodiments, metadata objects are represented as a single box, such as metadata objects 620 but in other embodiments may refer to many or a single metadata object. In other embodiments, if virtual machines inspecting the metadata objects see a series of sequential reads followed by writes to a file system or a block device, then this may be indicative of a problem (such as ransomware software). In many embodiments, if the virtual machines find a pattern of read and writes that is known to be associated with malware, spyware, or a virus, then this may indicate a problem.

Figure 17:
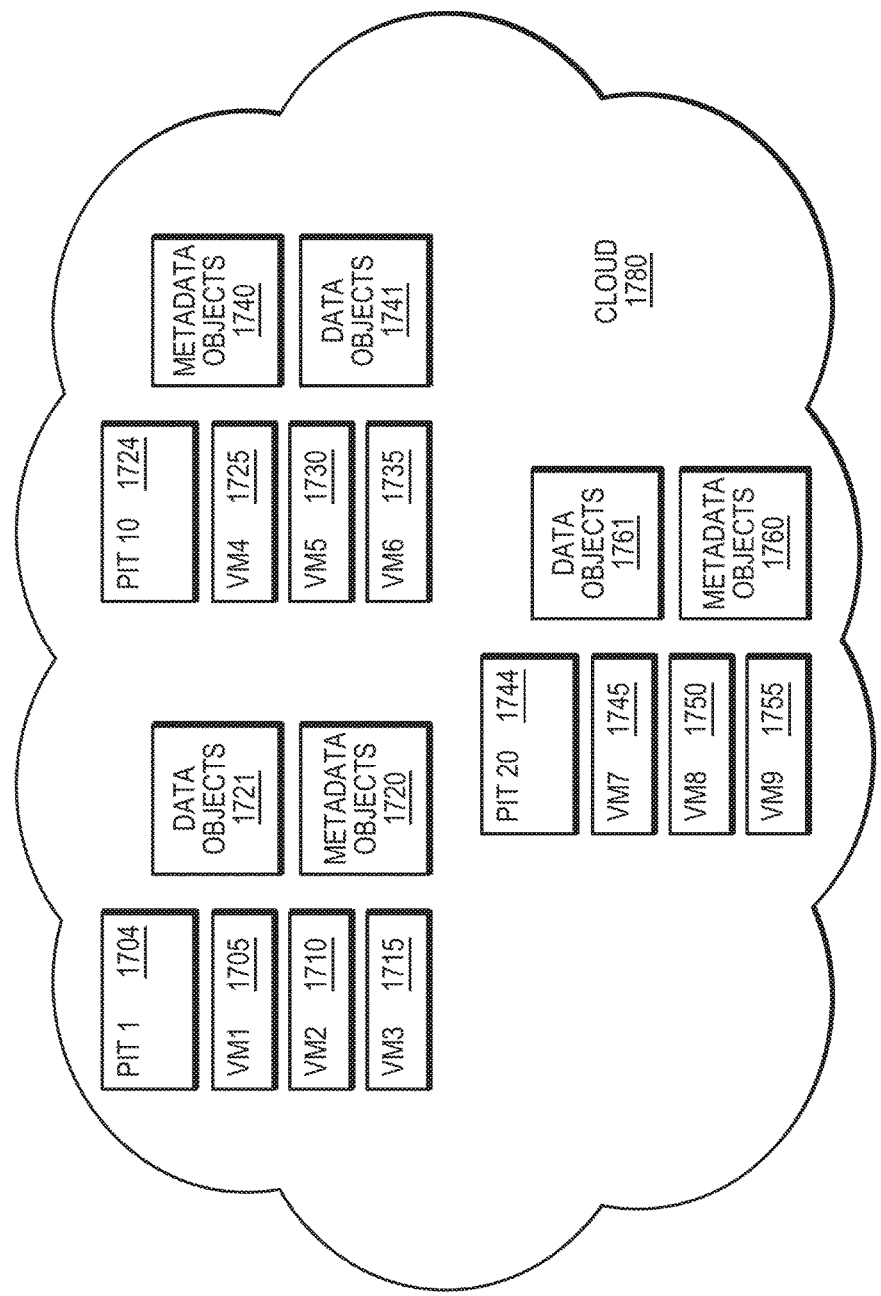
FIG. 17 is a simplified illustration of sets of virtual machines processing data objects and metadata objects to create points in time, in accordance with an embodiment of the present disclosure.
Figure 18:
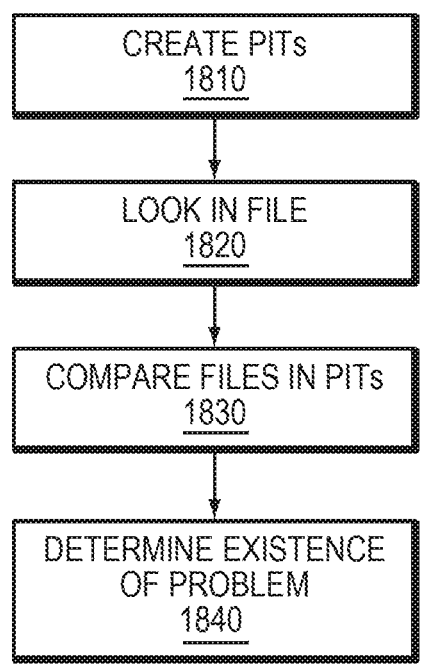
FIG. 18 is a simplified example of a method determining existence of a problem by creating points in time and examining files, in accordance with an embodiment of the present disclosure.
Figure 19:
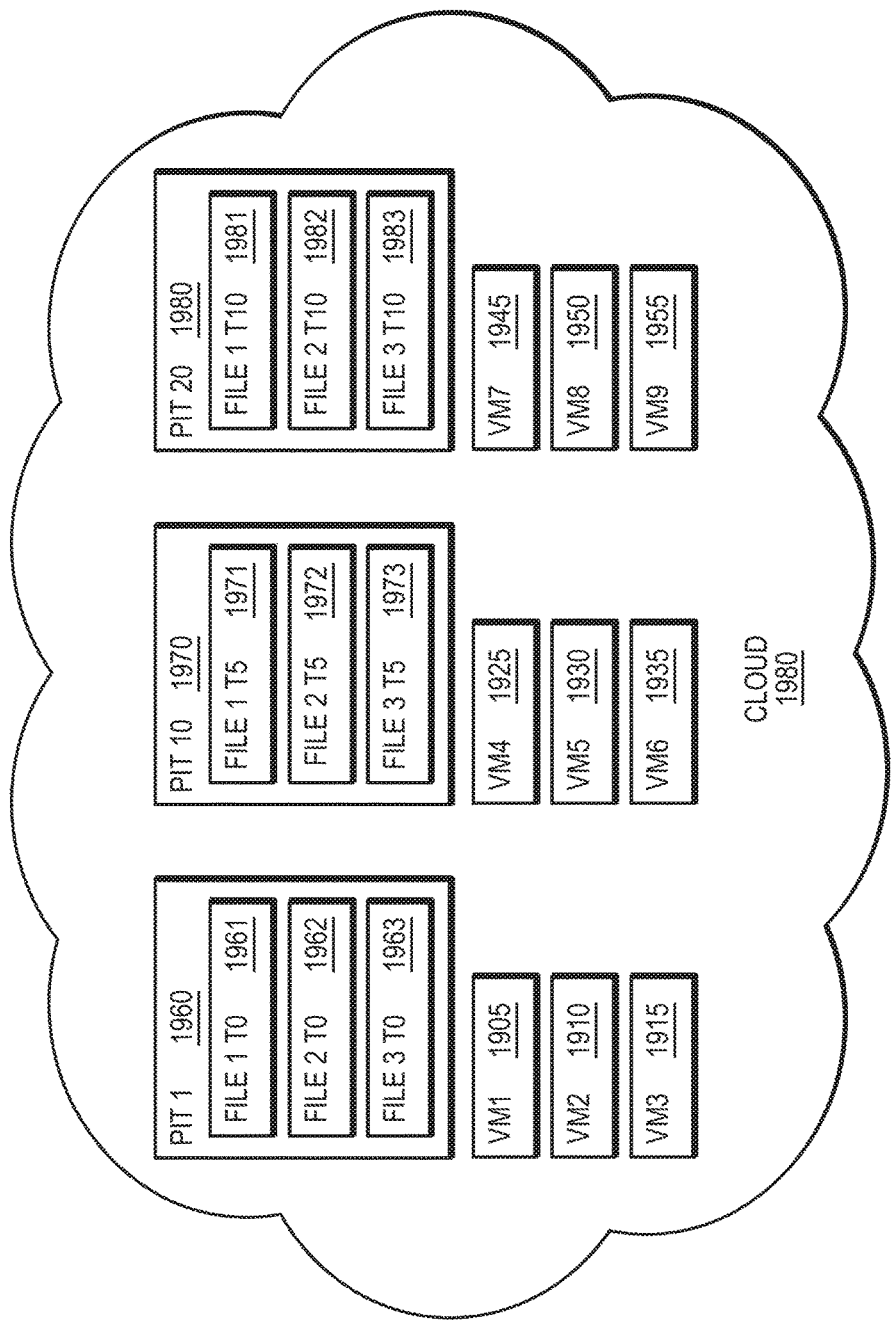
FIG. 19 is a simplified of sets of virtual machines looking at files in points in time to determine a problem, in accordance with an embodiment of the present disclosure.

Refer now to the example embodiments of FIGS. 17, 18, and 19 which illustrate building and examining points in time. In FIG. 17, Virtual machines 1705, 1710, and 1715 use data objects 1721 and metadata objects 1720 to build PIT 1 1704 (step 1810). Virtual machines 1725, 1730, and 1735 use data objects 1741 and metadata objects 1740 to build PIT 10 1724 (step 1810). Virtual machines 1745, 1750, and 1755 use data objects 1761 and metadata objects 1760 to build PIT 20 1744 (step 1810). FIG. 19, shows the result of building the points in time as PIT 1 1960, PIT 10, 1970 and PIT 20 1980. In FIG. 19, the data objects and corresponding metadata for each point in time have been used to create accessible points in times. In FIG. 19, each point in time has a set of files, such as File 1 at T0 1961, File 1 T0 1962, and File 3 T0 1963 for PIT 1 1960, File 1 at T5 1971, File 1 T5 1972, and File 3 T5 1973 for PIT 10 1970, such as File 1 at T10 1981, File 1 T10 1982, and File 3 T10 1983 for PIT 20 1980. Virtual machines 1905, 1910, and 1915 are assigned to look at the files in PIT 1 1960 (step 1820), Virtual machines 1925, 1930, and 1935 are assigned to look at the files in PIT 10 1970 (step 1820), and Virtual machines 1945, 1950, and 1955 are used to look at the files in PIT 20 (step 1820). The Virtual Machines also are able compare files between points in time what occurs between files (step 1830). The Virtual Machines determine the existence of a problem (step 1840). In most embodiments, a virtual machine may determine a problem exists when a file is recorded to be a certain type, such as a word file, but the file actually contains file information of another type. In many embodiments, a virtual machine may determine a problem exists when a file is stated to be a certain file type, such as a jpeg, but actually contains encrypted data. In further embodiments, a virtual machine may determine that there is a problem when comparing files across points in time as determining that changes have been made to the file.

Figure 20:
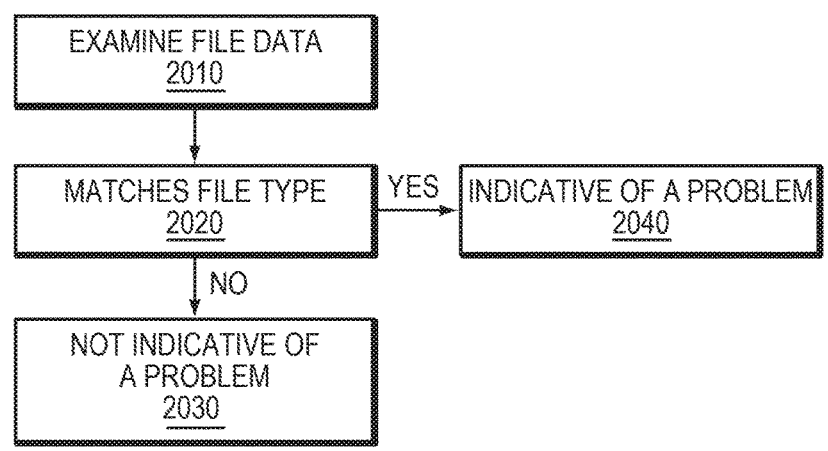
FIG. 20 is a simplified example of a method for determining a problem based on the data in a file, in accordance with an embodiment of the present.

Refer now to the example embodiment of FIG. 20, which illustrates a sample method for determining whether a problem exists. A virtual machine may examine file data for a point in time (step 2010). A virtual machine may determine whether the data of the file matches the file type (step 2020). If the file type does not match the file data, this is indicative of a problem (step 2040). If the file type matches the data of the file, this is not indicative of a problem (step 2030).

Figure 21:
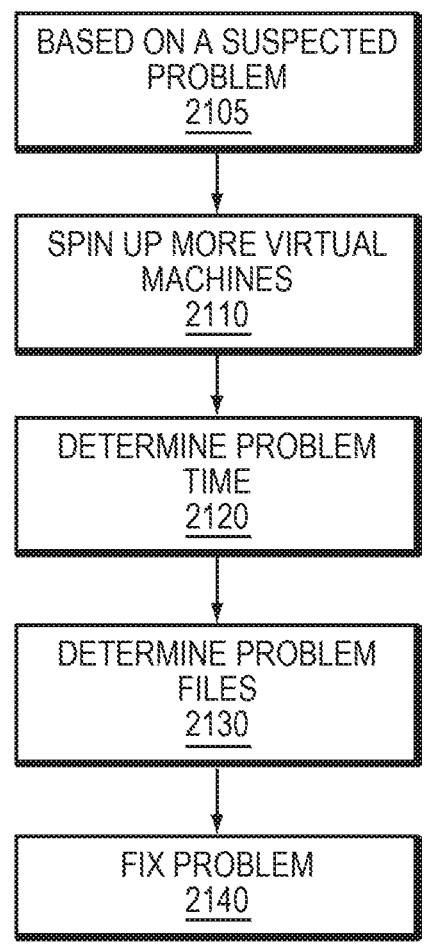
FIG. 21 is a simplified example of a method for determining and fixing a problem, in accordance with an embodiment of the present.

Refer now to the example embodiment of FIG. 21, which illustrates fixing a suspected problem. Based on a determination of a suspected problem (step 2105), virtual machines are spun up or created (step 2110). The virtual machines determine a problem time (step 2120). In certain embodiments the virtual machines may determine a problem time by applying some or all of the techniques described herein. Referring back to FIG. 21, the virtual machines determine which files have a problem (step 2130). The virtual machine fix the problem by restoring the data from an early point in time or resetting the data (step 2140).

Figure 22:
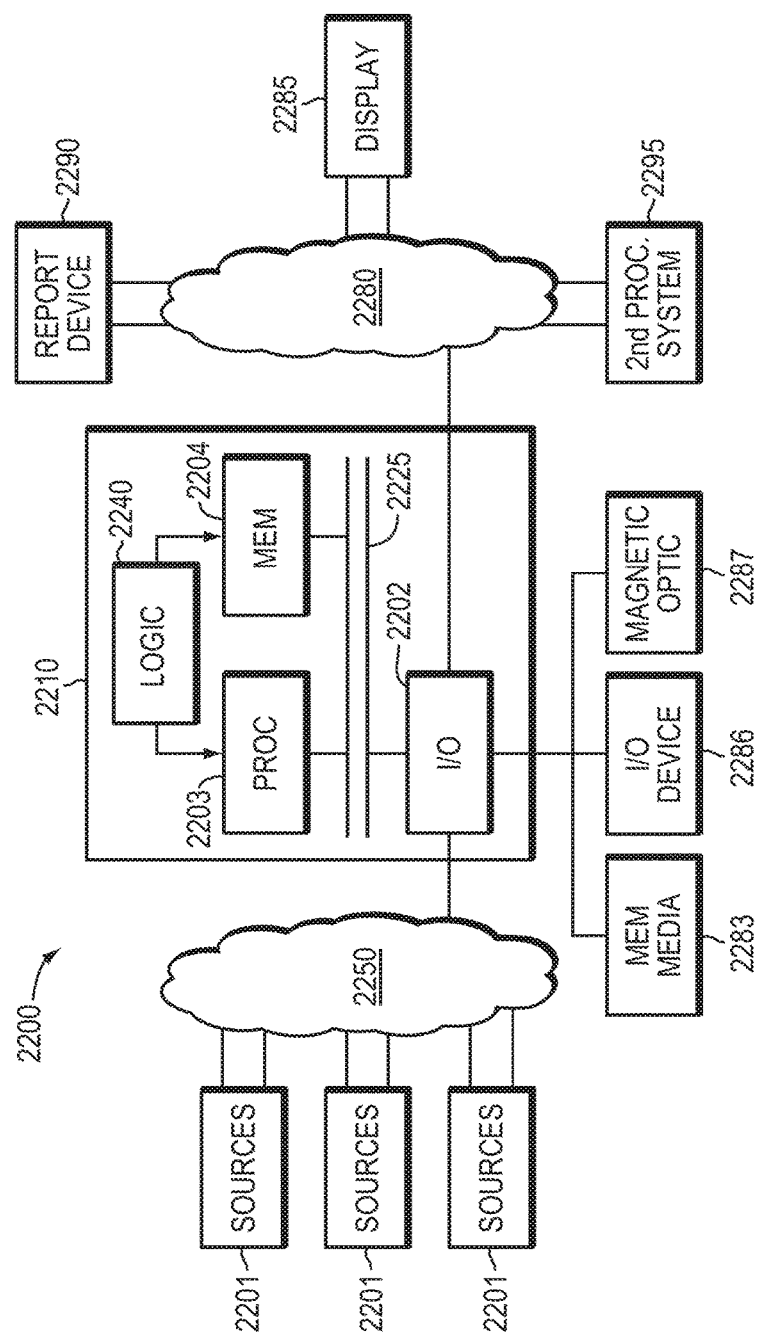
FIG. 22 is an example of an embodiment of an apparatus that may utilize the techniques described herein, in accordance with an embodiment of the present disclosure.
Figure 23:
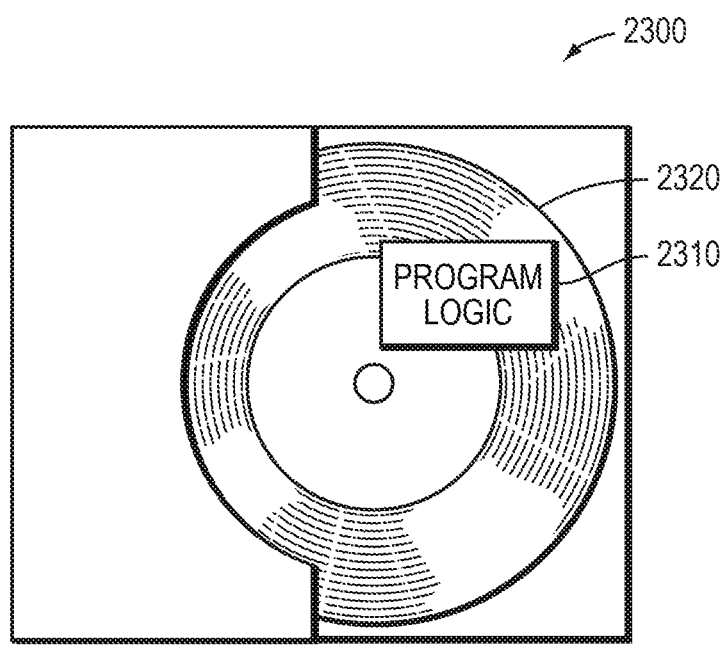
FIG. 23 is an example of an embodiment of a method embodied on a computer readable storage medium that may utilize the techniques described herein in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 22, the machine becomes an apparatus for practicing the invention. When implemented on one or more general-purpose processors, the program code combines with such a processor 2203 to provide a unique apparatus that operates analogously to specific logic circuits. As such a general purpose digital machine can be transformed into a special purpose digital machine. FIG. 23 shows Program Logic 2310 embodied on a computer-readable medium 2320 as shown, and wherein the Logic is encoded in computer-executable code configured for carrying out the reservation service process of this invention and thereby forming a Computer Program Product 2300. The logic 2310 may be the same logic 2240 on memory 2204 loaded on processor 2203. The program logic may also be embodied in software modules, as modules, or as hardware modules. A processor may be a virtual processor or a physical processor. Logic may be distributed across several processors or virtual processors to execute the logic. A storage medium may be a physical or logical device. A storage medium may consist of physical or logical devices. A storage medium may be mapped across multiple physical and/or logical devices. A storage medium may exist in a virtualized environment.

Figure 4:
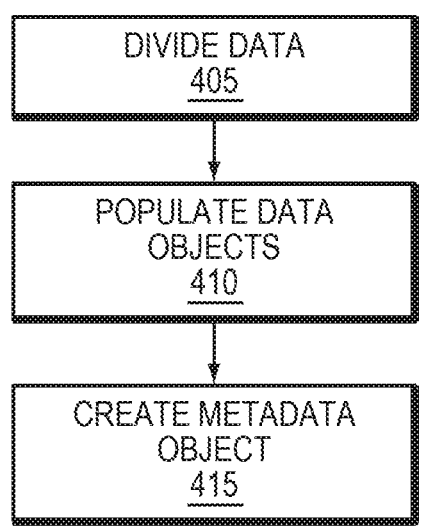
FIG. 4 is a simplified example of a method for creating a copy of a LUN as a set of objects, in accordance with an embodiment of the present disclosure.

The logic for carrying out the method may be embodied as part of the system described below, which is useful for carrying out a method described with reference to embodiments shown in, for example, FIGS. 4, 5, and 9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system comprising:
   an object store; wherein the object store has a set of objects corresponding to a copy of a storage device at one or more points in time (PITs) on a production site; wherein the object store includes data objects and metadata objects for each of the one or more PITs; wherein the data objects comprise data corresponding to divided sets of data for the one or more PITs: wherein the metadata objects comprise information describing how the sets of data are divided;
   computer-executable logic operating in memory, wherein the computer-executable program logic enables execution across the one or more processors of:
   scanning, using a set of virtual machines, at least one of the objects in the object store to determine if unwanted behavior has occurred on the production site.

2. The system of claim 1 wherein scanning at least one of the objects includes examining at least one of the metadata objects to determine suspicious access patterns to data on the production site.

3. The system of claim 2 wherein the at least one of the objects comprises metadata objects describing read and write data to the production site.

4. The system of claim 3 wherein the at least one of the objects further comprises data objects which represent data on the production site.

5. The system of claim 3 wherein the scanning includes using data objects and metadata objects to build one or more points in time corresponding to images at different points in time on the production site.

6. A computer implemented method comprising:
   scanning, using a set of virtual machines, at least an object in an object store to determine if unwanted behavior has occurred on a production site; wherein the object store has a set of objects corresponding to a copy of a storage device at one or more points in time (PITs) on a production site; wherein the object store includes data objects and metadata objects for each of the one or more PITs; wherein the data objects comprise data corresponding to divided sets of data for the one or more PITs; wherein the metadata objects comprise information describing how the sets of data are divided.

7. The method of claim 6 wherein scanning at least an object includes examining at least one of the metadata objects to determine suspicious access patterns to data on the production site.

8. The method of claim 7 wherein the at least one of the objects comprise metadata objects describing read and write data to the production site.

9. The method of claim 7 wherein the object store further comprises data objects which represent data on the production site.

10. The method of claim 8 wherein the scanning includes using data objects and metadata objects to build one or more points in time corresponding to images at different points in time on the production site.

11. The method of claim 6 wherein a set of virtual machines examines the PITs to determine if there are changes between files stored on different ones of the PITs.

12. A computer program product comprising:
    a non-transitory computer readable medium encoded with computer executable program code, wherein the code enables execution across one or more processors of:
    scanning, using a set of virtual machines, at least one object in an object store to determine if unwanted behavior has occurred on a production site; wherein the object store has a set of objects corresponding to a copy of a storage device at one or more points in time (PITs) on a production site; wherein the object store includes data objects and metadata objects for each of the one or more PITs; wherein the data objects comprise data corresponding to divided sets of data for the one or more PITs; wherein the metadata objects comprise information describing how the sets of data are divided.

13. The computer program product of claim 12 wherein scanning at least one of the objects includes examining at least one of the metadata objects to determine suspicious access patterns to data on the production site.

14. The computer program product of claim 13 wherein the at least one of the objects comprise metadata objects describing read and write data to the production site.

15. The computer program product of claim 13 wherein the object store further comprises data objects which represent data on the production site.

16. The computer program product of claim 14 wherein the scanning includes using data objects and metadata objects to build one or more points in time corresponding to images at different points in time on the production site.

17. The computer program product of claim 12 wherein a set of virtual machines examines the PITs to determine if there are changes between files stored on different ones of the PITs.

* * * * *